UNITED STATES PATENT OFFICE.

LOUIS C. JONES AND FRED L. GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING BORAX FROM ALKALINE DEPOSITS.

1,215,545.     Specification of Letters Patent.     Patented Feb. 13, 1917.

No Drawing.     Application filed August 30, 1916. Serial No. 117,594.

*To all whom it may concern:*

Be it known that we, LOUIS C. JONES and FRED L. GROVER, citizens of the United States, residing at Syracuse, in the county of Onondaga and State of New York, have invented a new and Improved Process of Recovering Borax from Alkaline Deposits, of which the following is a specification.

Our invention relates particularly to the treatment of alkaline deposits containing sodium carbonate, such as the brine of Searles lake in California, and the object of our improvements is the recovery in a pure state of the borax content of such deposits with the incidental recovery of other components of value.

In carrying our invention into effect the brine may, if desired, be treated in the first instance for the recovery of its sodium carbonate content in the shape of sodium bicarbonate, by blowing the brine with carbon dioxid gas in the usual manner or the brine may be treated in the first place without the removal of the sodium bicarbonate. In the former case, after the removal of the sodium carbonate originally present, sodium carbonate is restored to the brine by adding thereto sodium carbonate precipitated in the operation of the process as is fully described in an application for Letters Patent for a process of recovering constituents of value from alkaline deposits filed by us August 30, 1916, Serial No. 117,592.

In either case the brine containing sodium carbonate is heated and concentrated at a high temperature, from approximately 50° C. upward so as to leave ample margin for subsequent cooling. By such heating in the presence of sodium carbonate, boric acid and boric acid salts present, such as sodium tetraborate, are converted into more soluble sodium metaborate, (NaBO$_2$) the operation of our process being predicated upon keeping the boric acid content of the brine in solution until other less soluble salts have been removed.

By the concentration of the brine sodium carbonate, sodium sulfate and sodium chlorid are precipitated, the potassium salts, also owing to the presence of sodium carbonate, remaining in solution, and the concentration is continued until the point of saturation in potassium chlorid is reached, when the heating is stopped and the solution allowed to cool to approximately 20° C. when potassium chlorid precipitates, leaving sodium metaborate in solution. The mother liquor is then heated and carbonated by being blown with carbon dioxid gas until the equivalent of carbon dioxid to the metaborate present, in the sense of the reaction

$$4NaBO_2 + CO_2 \rightarrow Na_2B_4O_7 + Na_2CO_3$$

has been absorbed. For instance, if a liquid contains 94.6 g. p. l. Na$_2$CO$_3$, 12.7 g. p. l. Na$_2$B$_4$O$_7$, and 73.7 g. p. l. NaBO$_2$ (and is also saturated with NaCl and KCl) 12.3 g. p. l. CO$_2$ must be absorbed to convert the metaborate to tetraborate. In operating, such a liquor must be carbonated until a total of 39.3+12.3=51.6 g. p. l. CO$_2$ is present. The absorption of carbon dioxid goes on rapidly at 50° C. to 60° C. After the reaction is completed the carbonated liquor is cooled to approximately 20° C. when only pure borax is precipitated. This is then filtered out and the mother liquor is returned to the next batch of brine to be treated, for a further recovery of its potassium chlorid and borax content.

In case the cooling is stopped at a higher temperature the tetraborate may be precipitated in the form of octahedral borax (Na$_2$B$_4$O$_7$5H$_2$O). We prefer, however, to cool to the point indicated above where the precipitate is in the form of monoclinic borax (Na$_2$B$_4$O$_7$10H$_2$O), the usual borax of commerce.

In case a small excess of carbon dioxid shall have been added in carbonating the solution, sesquitertial-carbonate (NaHCO$_3$-Na$_2$CO$_3$2H$_2$O) will be precipitated with the borax. This does little harm, however, because being much more soluble than borax at 20° C. it is easily washed out.

Having thus described our invention what we claim as new and desire to secure by Letters Patent is:

1. The process of recovering borax from alkaline brines containing sodium carbonate which consists in heating the brine to convert boric acid and less soluble boric acid salts into more soluble sodium metaborate, concentrating the solution at a high temperature to precipitate sodium carbonate, sodium sulfate and sodium chlorid and then cooling to precipitate potassium chlorid while leaving sodium metaborate in solution and finally converting sodium metaborate into sodium tetraborate and precipitating the tetraborate as borax.

2. The process of recovering borax from alkaline brines which consists in converting boric acid and less soluble boric acid salts into more soluble sodium metaborate, precipitating out less soluble sodium salts and potassium chlorid while leaving sodium metaborate in solution and finally converting sodium metaborate into sodium tetraborate and precipitating the tetraborate as borax.

3. The process of recovering borax from alkaline brines which consists in converting boric acid and less soluble boric acid salts into more soluble sodium metaborate, precipitating out less soluble sodium salts and potassium chlorid while leaving sodium metaborate in solution and finally heating and carbonating the solution to convert sodium metaborate into sodium tetraborate and precipitating the tetraborate as borax.

4. The process of recovering borax from alkaline brines containing sodium carbonate which consists in heating the brine to convert boric acid and less soluble boric acid salts into more soluble sodium metaborate, concentrating the solution at a high temperature to precipitate sodium carbonate, sodium sulfate, and sodium chlorid and then cooling to precipitate potassium chlorid while leaving sodium metaborate in solution and finally heating and carbonating the solution to convert sodium metaborate into sodium tetraborate and precipitating the tetraborate as borax.

5. The improvement in the process of recovering borax from alkaline brines which consists in precipitating potassium chlorid and sodium salts present, other than the borate, while maintaining the boric acid content of the brine in solution and finally converting the boric acid content of the brine into sodium tetraborate and precipitating this as borax.

In testimony whereof we have affixed our signatures, this 28th day of August, 1916.

LOUIS C. JONES.
FRED L. GROVER.